UNITED STATES PATENT OFFICE.

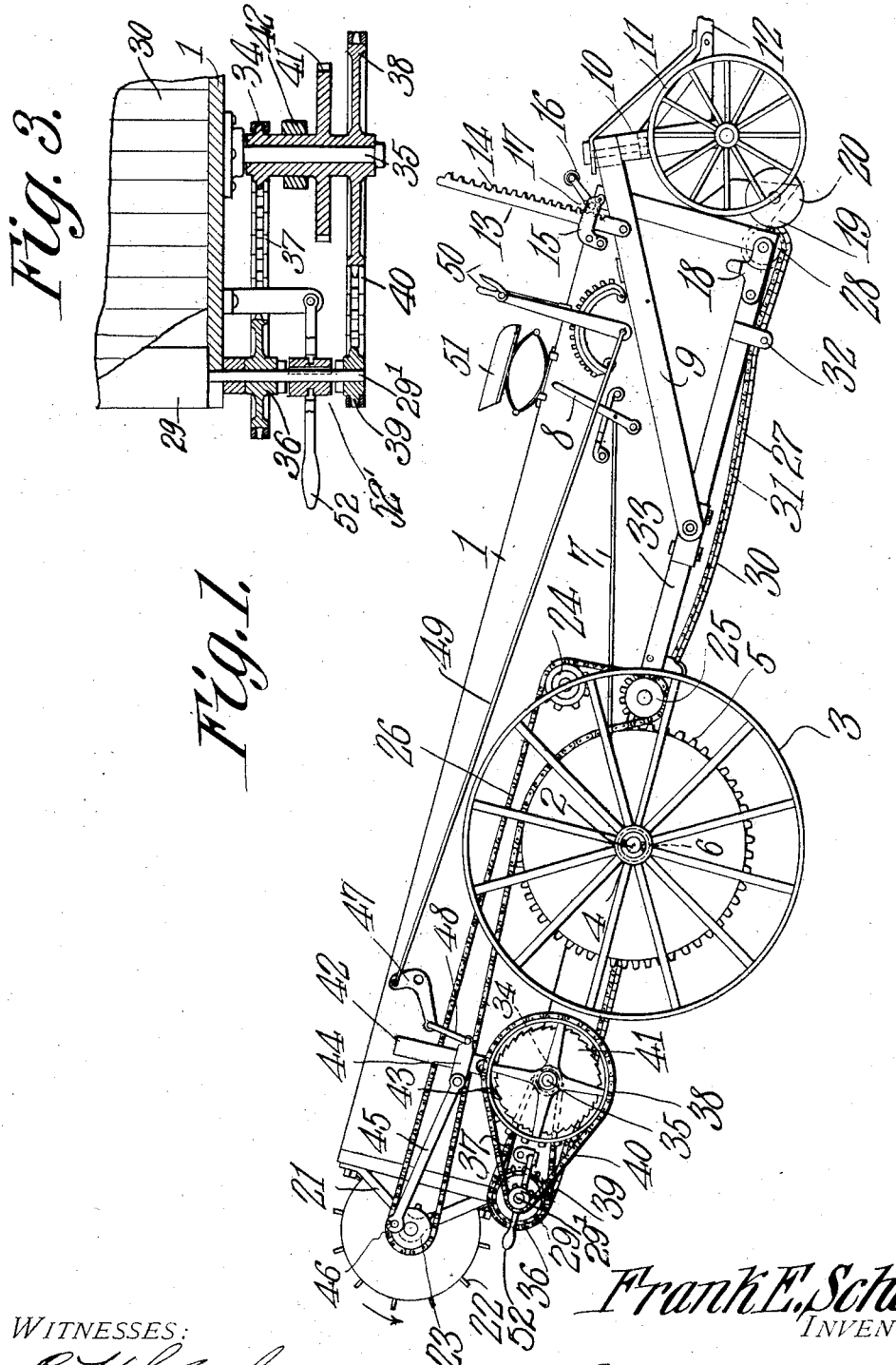

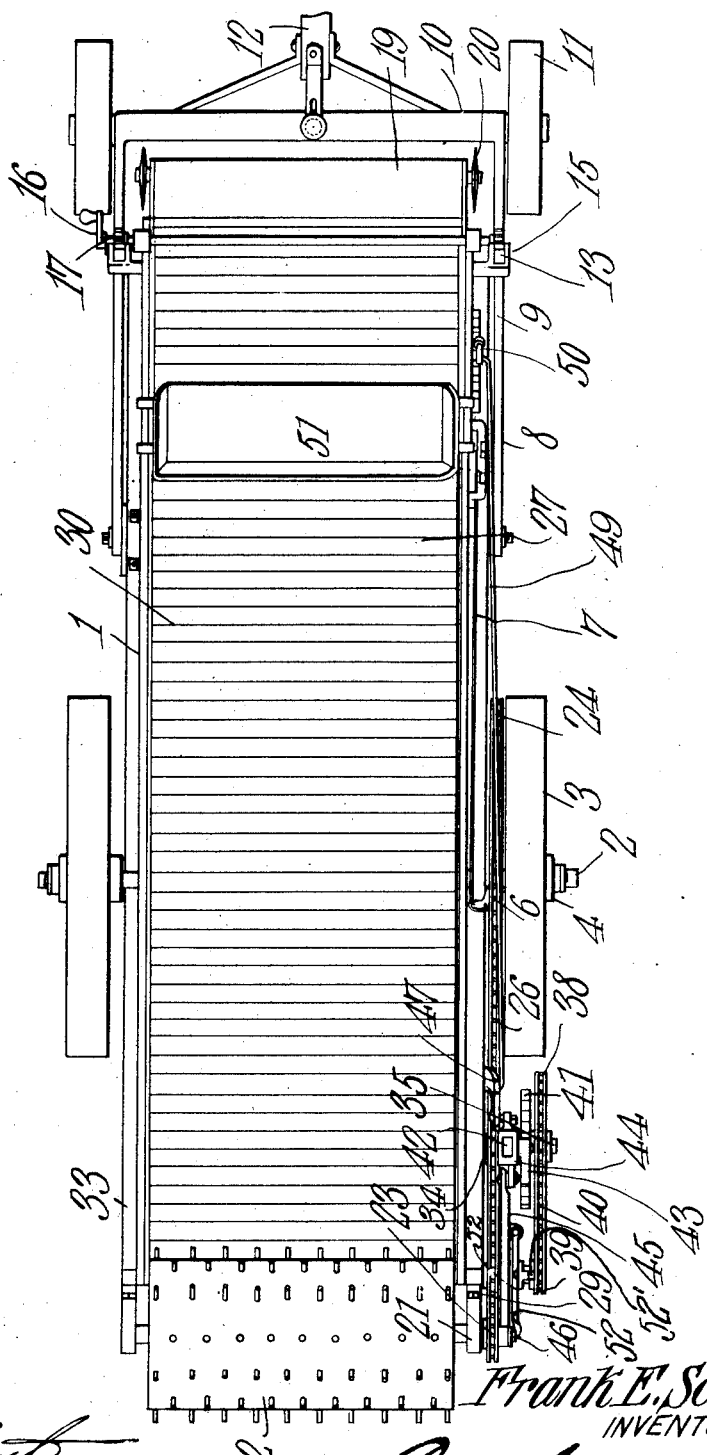

FRANK E. SCHEE, OF ATHENS, MISSOURI.

COMBINED MANURE LOADER AND SPREADER.

No. 883,243.   Specification of Letters Patent.   Patented March 31, 1908.

Application filed April 25, 1907. Serial No. 370,254.

*To all whom it may concern:*

Be it known that I, FRANK E. SCHEE, a citizen of the United States, residing at Athens, in the county of Clark and State of Missouri, have invented a new and useful Combined Manure Loader and Spreader, of which the following is a specification.

This invention has relation to combined manure loaders and spreaders and it consists in the novel construction and arrangement of its parts as hereinafter shown and described.

The object of the invention is to provide an apparatus of the character indicated which is adapted to gather the manure and when loaded may be transported to a field where the spreader is brought into operation for scattering the manure upon the surface of the ground.

In the accompanying drawing:—Figure 1 is a side elevation of the loader and spreader, Fig. 2 is a top plan view of the same and Fig. 3 is a detail sectional view of a portion of the same cut on the line 3—3 of Fig. 1.

The apparatus consists of the body 1, the rear portion of which is mounted upon the axle 2. The traction wheels 3 are mounted upon the axle 2 and are provided with ratchet devices 4 for rotating the said axle 2 in one direction only. The sprocket wheel 5 is journaled upon the axle 2 and a clutch 6 is located upon the said axle and is adapted to engage the hub of the sprocket wheel 5 to fix the same with relation to the axle. The said clutch is operated through the rod 7 and lever 8 fulcrumed near the forward end of the body 1. The arms 9 are pivoted at their lower rear ends to the sides of the body 1 and the yoke 10 of the caster wheel 11 is pivotally connected to the upper forward ends of said arms. A tongue 12 is suitably connected with the caster wheels 11 and arms 9. The rods 13 are provided at one edge with the gear teeth 14 and pass through the guides 15 attached to the sides of the body 1. The lower ends of the said rods 13 are pivoted to the bars 9. The crank shaft 16 is journaled upon the body 1 and is provided with gear wheels 17 which mesh with the gear teeth 14 of the rods 13. A spring clip 18 is attached to the side of the body 1 and is adapted to be sprung into engagement with the edge of one of the bars 9 when the forward end of the body 1 is held in an elevated position.

The forward end of the body 1 is open and is provided with a scoop 19 to the sides of which are journaled the colter wheels 20. The brackets 21 are attached to the rear end of the body 1 and the spreader 22 is journaled between the said bracket. The sprocket wheel 23 is fixed to the shaft of the spreader 22. The sprocket wheels 24 and 25 are journaled to the side of the body 1 and are in the same plane as the sprocket wheels 5 and 23. The sprocket chain 26 passes around the sprocket wheels 23 and 25 and over the sprocket wheel 24 and engages the sprocket teeth of the wheel 5 at the upper quarter thereof. The endless conveyer 27 passes around the rollers 28 and 29 located at the forward and rear ends respectively of the body 1. The roller 29 is fixed to the shaft 29'. The said conveyer is provided with the cross slats 30 which are mounted upon the sprocket chains 31. The body 1 is provided with the guides 32 for supporting the lower portion of the said conveyer while the upper portion thereof is supported by the sill or floor 33 of the body 1. The sprocket wheel 34 is journaled upon the pin 35 which is mounted upon the side of the body 1. The sprocket wheel 36 is journaled upon the shaft 29' and the sprocket chain 37 passes around the wheels 34 and 36. The larger sprocket wheel 38 is also journaled upon the pin 35 and the small sprocket wheel 39 is journaled upon the shaft 29'. The sprocket chain 40 passes around the wheels 38 and 39. The ratchet disk 41 is journaled upon the pin 35 and is attached to or connected with the sides of the wheels 34 and 38. As shown in Fig. 3, the wheels 34, 38 and 41 are made integral. The lever 42 is fulcrumed at its lower end upon the pin 35 and is provided with a spring actuated pawl 43 for engagement with the ratchet of the wheel 41. The collar 44 is slidably located upon the upper portion of the lever 42. The rod 45 is pivoted at one end to the collar 44 and at its other end is pivoted upon a wrist pin 46 eccentrically located upon the sprocket wheel 23. The bell crank lever 47 is fulcrumed to the side of the body 1 and one end of said lever is connected by means of a link 48 with the collar 44. The rod 49 is attached to the other end of the lever 47 and connects with the ratchet lever 50 which is fulcrumed to the side of the body 1 in the vicinity of the operator's seat 51.

The operation of the apparatus is as follows:—When it is desired to gather a load the spring clip 18 is disengaged from the bar 9 and by turning the crank shaft 16 the rods 13 are moved down and the forward end of the body 1 is lowered. When the scoop 19 is in contact with the surface of the ground the apparatus is drawn over the material to be collected and the said scoop will cut into the material and deliver the same upon the upper side of the conveyer 30. The colter wheels 20 will cut vertically into the material and sever objects such as stalks, etc.. As the wheels 3 rotate the axle 2 is also rotated and through the clutch 6 rotary movement is transmitted to the sprocket wheel 5. Thus the chain 26 which is in engagement with the sprocket teeth of the wheel 5 is set in motion and the spreader 22 is rotated. As the wheel 23 rotates the rod 45 is reciprocated and the upper end of the lever 42 is vibrated back and forth. At each rearward movement of the lever 42 the pawl 43 engages the ratchets of the wheel 41 and rotates the same intermittently. In as much as the wheels 38 and 34 are connected with the wheel 41 and rotate with the same, the chains 37 and 40 are moved longitudinally and the wheels 36 and 39 are rotated upon the shaft of the roller 29. A clutch mechanism 52' is provided for the purpose of fixing either one of the wheels 36 or 39 upon the shaft of the roller 29 and is adapted to be moved longitudinally of the shaft by a lever 52 to engage either one of the said wheels and at the same time disengage the other wheel. By this arrangement the roller 29 may be caused to rotate at a greater or less rate of speed as desired in as much as the sprocket wheels above referred to differ in diameter. As the conveyer 30 passes around the roller 29 and is actuated thereby the said conveyer may be made to move at a fast or slow rate of speed toward the roller 29 and thus, as the material is delivered from the scoop 19 upon the said conveyer it is transferred at the rate of speed desired toward the rear end of the body 1. The rate of speed at which the material is conveyed through the body is governed in a great measure by the thickness of the cut made by the scoop or the depth at which it will travel below the surface of the material. Through the ratchet lever 50, rod 49, bell crank lever 47 and link 48 the collar 44 may be moved longitudinally of the lever 42 toward or away from the fulcrum point thereof. Thus the sweep of the said lever may be increased or diminished as motion is imparted to the same through the rod 45 connected at its rear end to the sprocket wheel 23.

When the body 1 is loaded the forward end thereof is elevated through the instrumentality of the crank shaft 16, gear wheel 17 and rod 13 and when the clip 18 passes over the upper edge of the bar 9 the said clip springs into engagement with the upper edge of the said bar and holds the forward end of the body in an elevated position. By manipulating the lever 8 the clutch 6 may be moved to throw the wheel 5 out of engagement with the axle 2 and thus the spreader may be drawn to the field without operating the conveyer. When the field is reached the sprocket wheel 5 is caused to rotate with the axle 2 by moving the clutch 6 into engagement with the said sprocket wheel when the conveyer 30 and spreader 22 will begin operation as above described in transferring the material to the rear end of the body 1 while the spreader will take the material up and cast it upon the surface of the field. In discharging the material the parts may be manipulated as above described for conveying the material toward the conveyer or spreader 22 at a greater or less rate of speed as conditions may require.

Having described my invention what I claim as new and desire to secure by Letters-Patent is:—

A combined load gatherer and spreader comprising traction wheels, a body having a closed bottom and an open forward end tiltably mounted upon said wheel, a conveyer traversing the length of the body, a gatherer located at the forward end of the body, a rotating spreader located at the opposite end of the body, means operatively connecting the spreader with the traction wheels for rotating the spreader in the opposite direction from that in which the traction wheels rotate and means operatively connecting the spreader with the conveyer.

In testimony that I claim the foregoing as my own, I have hereto affixed my signature in the presence of two witnesses.

FRANK E. SCHEE.

Witnesses:
 J. C. SCHEE,
 B. F. KETCHAM.